United States Patent
Kousaridas et al.

(10) Patent No.: US 12,470,997 B2
(45) Date of Patent: Nov. 11, 2025

(54) DYNAMIC UPDATE OF PATH SELECTION POLICY FOR USER EQUIPMENT IN WIRELESS COMMUNICATION NETWORK

(71) Applicant: HUAWEI TECHNOLOGIES CO., LTD., Guangdong (CN)

(72) Inventors: Apostolos Kousaridas, Munich (DE); Chan Zhou, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 18/146,117

(22) Filed: Dec. 23, 2022

(65) Prior Publication Data

US 2023/0127601 A1    Apr. 27, 2023

Related U.S. Application Data

(63) Continuation of application No. PCT/EP2020/067797, filed on Jun. 25, 2020.

(51) Int. Cl.
*H04W 40/02* (2009.01)
*H04W 8/02* (2009.01)
(Continued)

(52) U.S. Cl.
CPC ............ *H04W 40/12* (2013.01); *H04W 8/02* (2013.01); *H04W 28/0268* (2013.01); *H04W 40/04* (2013.01)

(58) Field of Classification Search
CPC . H04W 28/0268; H04W 40/02; H04W 40/04; H04W 40/12; H04W 8/02
See application file for complete search history.

(56) References Cited

U.S. PATENT DOCUMENTS

2018/0098370 A1*  4/2018  Bangolae .............. H04W 4/023
2019/0268835 A1   8/2019  Shan et al.
(Continued)

FOREIGN PATENT DOCUMENTS

GB          2480432 A       11/2011
WO       2011144589 A1     11/2011
(Continued)

OTHER PUBLICATIONS

ETSI TS 123 502 V15.9.0, "5G; Procedures for the 5G System (5GS) (3GPP TS 23.502 version 15.9.0 Release 15)," Mar. 2020, 364 pages.
(Continued)

*Primary Examiner* — Barry W Taylor
(74) *Attorney, Agent, or Firm* — Fish & Richardson P.C.

(57) ABSTRACT

The present disclosure relates generally to the field of wireless communications, and particularly to a procedure for dynamically updating a path selection policy for a UE in a wireless communication network. According to this procedure, a network entity detects a need to update the path selection policy based on data relating to a first communication path currently used in accordance with the path selection policy and at least one other communication path available in a wireless communication network. The data may comprise RRM measurements, Radio Channel measurements, QoS parameters, their statistics or predictions, and UE notifications of a success rate of the path selection policy. By using the data, the network entity dynamically updates the path selection policy by selecting, among the at least one other communication path, a second communication path to be used to support the communication service instead of the first communication path.

20 Claims, 11 Drawing Sheets

(51) Int. Cl.
*H04W 28/02* (2009.01)
*H04W 40/04* (2009.01)
*H04W 40/12* (2009.01)

(56) References Cited

U.S. PATENT DOCUMENTS

| | | | |
|---|---|---|---|
| 2019/0373441 A1 | 12/2019 | Ryu et al. | |
| 2019/0394279 A1 | 12/2019 | Dao et al. | |
| 2020/0107213 A1* | 4/2020 | Park | H04L 43/12 |
| 2020/0228420 A1* | 7/2020 | Dao | H04L 41/149 |
| 2022/0182979 A1* | 6/2022 | Freda | H04W 72/569 |
| 2022/0377529 A1* | 11/2022 | Kim | H04W 8/08 |
| 2023/0033619 A1* | 2/2023 | Lovlekar | H04W 72/541 |
| 2023/0036475 A1* | 2/2023 | Yu | G08G 1/096844 |

FOREIGN PATENT DOCUMENTS

| | | |
|---|---|---|
| WO | 2018069181 A1 | 4/2018 |
| WO | 2018077253 A1 | 5/2018 |

OTHER PUBLICATIONS

Huawei et al., "Solution for KI#5: Support direct communication path selection between PC5 and Uu," SA WG2 Meeting #136AH, S2-2001664, Incheon, South Korea, Jan. 13-17, 2020, 4 pages.

Samsung et al., "KI#5, Sol #12: Update to Policy based network-assisted Path Selection," SA WG2 Meeting #139E, S2-2004744, Elboniaz, Jun. 1-12, 2020, 6 pages.

3GPP TS 23.502 V16.4.0, "3rd Generation Partnership Project; Technical Specification Group Services and System Aspects; Procedures for the 5G System (5GS); Stage 2 (Release 16)," Mar. 2020, 582 pages.

Orange et al., "Updates of Solution #3," 3GPP TSG-SA WG2 Meeting #128BIS, S2-187945, Sophia Antipolis, France, Aug. 20-24, 2018, 3 pages.

3GPP TS 29.525 V16.3.0, "3rd Generation Partnership Project; Technical Specification Group Core Network and Terminals; 5G System; UE Policy Control Service; Stage 3 (Release 16)," Mar. 2020, 53 pages.

3GPP TS 24.587 V16.0.0, "3rd Generation Partnership Project; Technical Specification Group Core Network and Terminals; Vehicle-to-Everything (V2X) services in 5G System (5GS); Stage 3 (Release 16)," Mar. 2020, 63 pages.

3GPP TS 24.501 V16.4.1, "3rd Generation Partnership Project; Technical Specification Group Core Network and Terminals; Non-Access-Stratum (NAS) protocol for 5G System (5GS); Stage 3; (Release 16)," Mar. 2020, 666 pages.

3GPP TS 28.552 V16.5.0, "3rd Generation Partnership Project; Technical Specification Group Services and System Aspects; Management and orchestration; 5G performance measurements (Release 16)," Mar. 2020, 173 pages.

3GPP TS 28.554 V16.4.0, "3rd Generation Partnership Project; Technical Specification Group Services and System Aspects; Management and orchestration; 5G end to end Key Performance Indicators (KPI) (Release 16)," Mar. 2020, 22 pages.

3GPP TR 23.752 V0.3.0, "3rd Generation Partnership Project; Technical Specification Group Services and System Aspects; Study on system enhancement for Proximity based Services (ProSe) in the 5G System (5GS) (Release 17)," Jan. 2020, 73 pages.

3GPP TS 24.526 V16.3.0, "3rd Generation Partnership Project; Technical Specification Group Core Network and Terminals; User Equipment (UE) policies for 5G System (5GS); Stage 3 (Release 16)," Mar. 2020, 51 pages.

3GPP TS 22.186 V16.2.0, "3rd Generation Partnership Project; Technical Specification Group Services and System Aspects; Enhancement of 3GPP support for V2X scenarios; Stage 1 (Release 16)," Jun. 2019, 18 pages.

3GPP TR 22.842 V17.2.0, "3rd Generation Partnership Project; Technical Specification Group Services and System Aspects; Study on Network Controlled Interactive Services (Release 17)," Dec. 2019, 29 pages.

3GPP TS 23.501 V16.4.0, "3rd Generation Partnership Project; Technical Specification Group Services and System Aspects; System architecture for the 5G System (5GS); Stage 2 (Release 16)," Mar. 2020, 430 pages.

3GPP TS 23.503 V16.4.1, "3rd Generation Partnership Project; Technical Specification Group Services and System Aspects; Policy and charging control framework for the 5G System (5GS); Stage 2 (Release 16)," Apr. 2020, 115 pages.

3GPP TS 29.507 V16.3.0, "3rd Generation Partnership Project; Technical Specification Group Core Network and Terminals; 5G System; Access and Mobility Policy Control Service; Stage 3 (Release 16)," Mar. 2020, 55 pages.

International Search Report and Written Opinion in International Appln. No. PCT/EP2020/067797, mailed on Feb. 19, 2021, 15 pages.

Office Action in Indian Appln. No. 202227072950, dated Apr. 10, 2023, 6 pages (with English translation).

* cited by examiner

DYNAMIC UPDATE OF PATH SELECTION POLICY FOR USER EQUIPMENT IN WIRELESS COMMUNICATION NETWORK

CROSS-REFERENCE TO RELATED APPLICATIONS

This application is a continuation of International Application No. PCT/EP2020/067797, filed on Jun. 25, 2020, the disclosure of which is hereby incorporated by reference in its entirety.

TECHNICAL FIELD

The present disclosure relates generally to the field of wireless communications, and particularly to techniques for dynamically updating a path selection policy for a user equipment (UE) in a wireless communication network.

BACKGROUND

A path selection policy is provided by a wireless communication network (i.e. a certain network operator or entity) to a UE to assist the UE in determining a communication path or interface that should be selected to support a required communication service. The communication path may be, for example, selected such that it provides expected Quality of Service (QoS). The path selection policy may help the UE determine the appropriate communication path in a faster manner. At the same time, the network may assist the UE in selecting a better communication path for the communication service by providing the UE with different information about available communication paths.

If the communication service is represented by a proximity service, such, for example, as a Network-Controlled Interactive Service (NCIS), a Vehicle-to-Everything (V2X) service, etc., and the available communication paths comprise a Uu path and a sidelink path, the path selection policy may indicate that the Uu path should only be used, or the sidelink path should only be used, or even indicate that it is up to the UE to decide which of the Uu and sidelink paths should be used to support the proximity service. For example, such path selection may rely on radio and/or network conditions in specific geographic regions to associate a certain (e.g., Uu or sidelink) communication path with various communication (e.g., proximity) services.

Since the wireless communication network is a dynamically changing environment, the radio and/or network conditions may change quite quickly. However, the existing path selection policies are static in the sense that they cannot quickly adapt to the changes of the radio and/or network conditions. Therefore, the existing path selection policies may lead to sub-optimal selection of the communication path, thereby adversely impacting the expected QoS and the whole network performance.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that allows a path selection policy for a UE to be updated dynamically in a wireless communication network.

The objective above is achieved by the features of the independent claims in the appended claims. Further embodiments and examples are apparent from the dependent claims, the detailed description and the accompanying drawings.

According to a first aspect, a network entity in a wireless communication network is provided. The network entity comprises at least one processor and a memory coupled to the at least one processor and configured to store processor-executable instructions. Being caused by the processor-executable instructions, the least one processor is configured to detect a triggering event that requires a path selection policy for a UE to be updated. The path selection policy for the UE is indicative of a first communication path to be used to support a communication service. The triggering event is based on data that are related to the first communication path and/or at least one other communication path available in the wireless communication network. The at least one processor is further configured to update, based on the data, the path selection policy for the UE. In particular, said updating involves selecting, among the at least one other communication path, a second communication path to be used to support the communication service instead of the first communication path. In this configuration, the network entity may dynamically update the path selection policy for the UE, considering radio and/or network conditions in the communication paths available in the wireless communication network.

In one embodiment of the first aspect, the at least one processor is further configured to indicate, in the updated path selection policy for the UE, at least one of the following:
  a traffic type for which the second communication path is to be used;
  a UE location area where the second communication path is to be used;
  communication thresholds at which the second communication path is to be used;
  an application or proximity service type for which the second communication path is to be used; and
  a timer indicative of a time period in which the second communication path is to be used.

With such additional information, the second communication path may be used by the UE more efficiently, thereby improving the QoS of the UE or the whole network performance.

In one embodiment of the first aspect, the first communication path comprises one of a Uu path and a sidelink path, and the second communication path comprises another of the Uu path and the sidelink path. This may make the network entity more flexible in use.

In one embodiment of the first aspect, the data relating to the first communication path and/or the at least one other communication path comprise at least one of the following:
  Radio Resource Management (RRM) measurements,
  Radio Channel measurements;
  Quality of Service (QoS) parameters;
  statistics or predictions of the RRM measurements, the Radio Channel measurement, and the QoS parameters; and
  UE notifications of a success rate of the path selection policy.

With such data, the triggering event may be detected and the path selection policy may be updated more efficiently. In particular, such data allow the network entity to select the appropriate second communication path among the communication paths available in the wireless communication network.

In one embodiment of the first aspect, the at least one processor is further configured to send a request for at least one of the RRM measurements, the QoS parameters, the Radio Channel measurements, and the statistics or predictions to at least one other network entity in the wireless communication network, and to receive the at least one of the RRM measurements, the QoS parameters, the Radio Channel measurements, and the statistics or predictions from the at least one other network entity. By so doing, it is possible to assign the function of gathering the data to one or more other network entities in the wireless communication network, thereby efficiently distributing a network load in the wireless communication network and collecting faster and more accurate data useful for the path selection policy update.

In one embodiment of the first aspect, the at least one processor is further configured to receive the UE notifications of the success rate of the path selection policy from the UE or at least one other network entity in the wireless communication network. Similarly, this allows assigning the function of gathering the UE notifications to one or more other network entities in the wireless communication network, thereby efficiently distributing the network load in the wireless communication network. At the same time, gathering the UE notifications in the network entity according to the first aspect may be advantageous in scenarios when if it is required to receive the UE notifications as soon as possible (i.e. with no delay caused by sending the request for the UE notifications to one or more other network entities and waiting for a reply to the request).

In one embodiment of the first aspect, the at least one processor is further configured to detect the triggering event by receiving a notification of the triggering event from at least one other network entity in the wireless communication network. In this embodiment, the function of detecting the triggering event may be assigned to one or more other network entities, thereby allowing the network load to be efficiently distributed in the wireless communication network.

In one embodiment of the first aspect, the notification of the triggering event comprises at least one of the following:
- a type of the triggering event;
- an identifier or descriptor of the path selection policy to be updated;
- an identifier of a QoS flow;
- a QoS status;
- an application type or identifier to be used via the communication service;
- a proximity service type to be used via the communication service; and
- conditions under which the second communication path is to be used.

The notification thus configured may facilitate the selection of the appropriate second communication path for the communication service. In other words, the network entity according to the first aspect may use the contents of the notification to narrow the search scope of the second communication path among the available communication paths in the wireless communication network.

In one embodiment of the first aspect, the at least one processor is further configured to provide the updated path selection policy to the UE or to at least one other network entity in the wireless communication network. This may provide the flexibility-in-use of the network entity according to the first aspect.

In one embodiment of the first aspect, the at least one processor is further configured to send a request for recommendations for selecting the second communication path to at least one other network entity in the wireless communication network, and to receive the recommendations from the at least one other network entity. The recommendations are based on at least one of path preferences for the communication service, a traffic description relating to the communication service, and a UE location. The recommendations may facilitate the selection of the appropriate second communication path for the communication service.

In one embodiment of the first aspect, the network entity is configured to be implemented as one of a Policy Charging Function (PCF) entity, an Application Function (AF) entity, and a Network Data Analytics Function (NWDAF) entity. In turn, the at least one other network entity may comprise at least one of a PCF entity, a NWDAF entity, an AF entity, a Radio Access Node (RAN), an Operation and Maintenance (OAM) entity, and any other core network entity. This makes the network entity according to the first aspect applicable in 5th Generation (5G) mobile communications systems.

In one embodiment of the first aspect, the wireless communication network is a Visiting Public Land Mobile Network (VPLMN), and the network entity is configured to be implemented as a visiting PCF entity. In this embodiment, the at least one processor is further configured to update the path selection policy for the UE present within the VPLMN by sending a request for updating the path selection policy to a home PCF entity of a Home Public Land Mobile Network (HPLMN), and receiving a confirmation from the home PCF entity that the path selection policy has been updated based on the data and/or the recommendations. The request itself may comprise the data that are related to the first communication path and/or the at least one other communication path available in the VPLMN, and/or the recommendations for selecting the second communication path. With such configuration, it is possible to use the network entity according to the first aspect for controlling the path selection policy in roaming situations, thereby making the network entity according to the first aspect more flexible in use.

In one embodiment of the first aspect, the at least one processor is further configured to request the home PCF entity to grant an authority to update the path selection policy for the UE in the visiting PCF entity, and to receive a confirmation from the home PCF entity that the visiting PCF entity is granted the authority to update the path selection policy for the UE. By so doing, it is possible to efficiently and dynamically update the path selection policy for the UE in the roaming situations.

In one embodiment of the first aspect, the path selection policy is part of any one of a UE Route Selection Policy (URSP), a Proximity Service Policy (ProSE), a Vehicle-to-Everything (V2X) Policy (V2XP), and an Access Network Discovery and Selection Policy (ANDSP). This may make the network entity according to the first aspect more flexible in use.

According to a second aspect, a method for operating a network entity in a wireless communication network is provided. The method starts with the step of detecting a triggering event that requires a path selection policy for a UE to be updated. The path selection policy for the UE is indicative of a first communication path to be used to support a communication service. The triggering event is based on data that are related to the first communication path and/or at least one other communication path available in the wireless communication network. Further, the method proceeds to the step of updating, based on the data, the path selection policy for the UE. Said updating involves selecting, among the at least one other communication path, a second communication path to be used to support the communication service instead of the first communication path. By so doing, it is possible to dynamically update the path selection policy for the UE, considering radio and/or network conditions in the communication paths available in the wireless communication network.

According to a third aspect, a computer program product is provided. The computer program product stores a computer-readable storage medium comprising a computer code. When executed by at least one processor, the computer code causes the at least one processor to perform the method according to the second aspect. By using such a computer program product, it is possible to simplify the implementation of the method according to the second aspect in any network device, such, for example, as the network entity according to the first aspect.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which.

DETAILED DESCRIPTION

Figure 1:
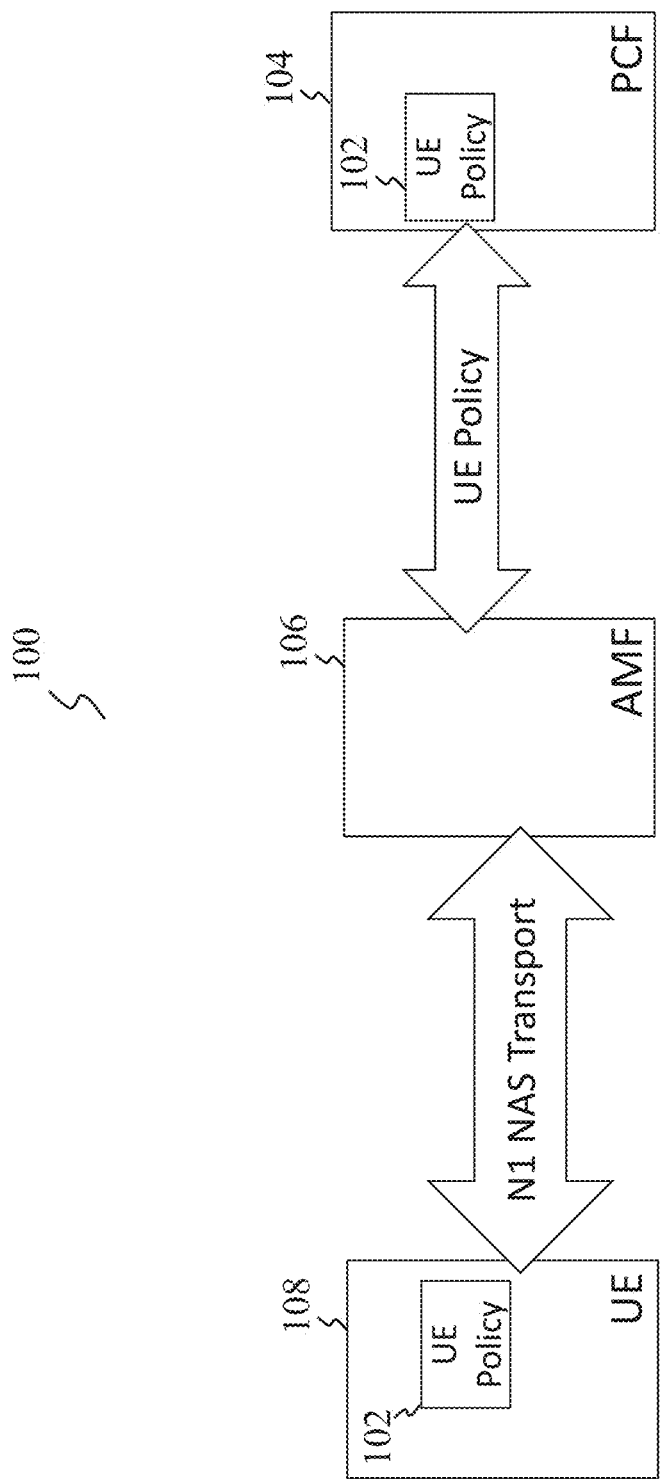
FIG. 1 shows a typical policy delivery scheme used in a 5G network architecture.

Various embodiments of the present disclosure are further described in more detail with reference to the accompanying drawings. However, the present disclosure may be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatus and method disclosed herein may be implemented in practice by using any numbers of the embodiments provided herein. Furthermore, it should be understood that any embodiment of the present disclosure may be implemented using one or more of the elements presented in the appended claims.

The word "exemplary" is used herein in the meaning of "used as an illustration". Unless otherwise stated, any embodiment described herein as "exemplary" should not be construed as preferable or having an advantage over other embodiments.

According to the embodiments disclosed herein, a user equipment or UE for short may refer to a mobile device, a mobile station, a terminal, a subscriber unit, a mobile phone, a cellular phone, a smart phone, a cordless phone, a personal digital assistant (PDA), a wireless communication device, a laptop computer, a tablet computer, a gaming device (e.g., a gaming console, a gaming controller, etc.), a netbook, a smartbook, an ultrabook, a medical device or medical equipment, a biometric sensor, a wearable device (e.g., a smart watch, smart glasses, a smart wrist band, etc.), an entertainment device (e.g., an audio player, a video player, etc.), a vehicular component or sensor, a smart meter/sensor, an unmanned vehicle (e.g., an industrial robot, a quadcopter, etc.), industrial manufacturing equipment, a global positioning system (GPS) device, an Internet-of-Things (IoT) device, a machine-type communication (MTC) device, a group of Massive IoT (MIoT) or Massive MTC (mMTC) devices/sensors, or any other suitable device configured to support wireless communications. In some example embodiments, the UE may refer to at least two collocated and inter-connected UEs thus defined.

According to the embodiments disclosed herein, a network entity, also known as a network function or a network node, may refer to a logically separate entity with well-defined one or more functionalities in a network architecture (e.g., 5G network architecture). There are also well-defined interfaces between different network entities. The network entity may be implemented in variety of ways. For example, it may be implemented on a dedicated hardware or as a software instance on the dedicated hardware, or as a virtualized function instantiated on an appropriate platform, such as a cloud. Furthermore, the network entity may be implemented as a standalone product, or different network entities may be combined in the same product. Each network entity has a distinct role in the network architecture. The number and roles of the network entities in the network architecture depend on the purpose for which the network architecture is used.

Policy and Charging Control (PCC) plays a crucial role in the 5G network architecture. It provides transparency and control over the consumption of network resources during real-time service delivery. A Policy Charging Function (PCF) entity governs control plane functions via predefined policy rules and user plane functions via policy enforcement. The PCF entity supports key aspects of the 5G network architecture, such as QoS control, traffic steering/routing, application and its capabilities detection, subscriber spending/usage monitoring, enabling differentiated services, gating control, network slice enablement, roaming support, etc.

The PCF entity may be associated with the following other network entities in the typical 5G network architecture: Access and Mobility Management Function (AMF), Application Function (AF), Network Data Analytics Function (NWDAF), Operations, administration and management (OAM) function, Session Management Function (SMF), Access Node (AN), etc. The AMF entity performs operations like mobility management, registration management, connection management, UE-based authentication, etc. The AF entity performs operations like interaction with the PCF for the PCC, application traffic routing, exposing services to end users, etc. The NWDAF entity is used for data collection and analytics for centralized and edge computing resources. The OAM entity provides system or network fault indication, performance monitoring, security management, system or network diagnostics, configuration and user provisioning. The SMF entity performs operations like session management, IP address allocation and management for UEs, user plane selection and packets routing, QoS and policy enforcement for control plane, etc. The AN is used to connect the UE to a Data Network (DN) through a Core Network (CN) in the predefined region of a wireless communication network, and may be implemented as a Radio AN (RAN), a Global System for Mobile Communications (GSM) RAN (GRAN), a GMS EDGE RAN (GERAN), a Universal Mobile Telecommunications System (UMTS) RAN (UTRAN), a Long-Term Evolution (LTE) UTRAN (E-UTRAN), or Next-Generation (NG) RAN. It should be noted that the predefined region may be represented by a coverage region served by the AN. In turn, the coverage region may be represented by different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home).

As used in the embodiments disclosed herein, a path selection policy for the UE may refer to a set of rules for determining an appropriate communication path to be used by the UE to support a required communication service. The path selection policy may be part of any other UE policy, such, for example, as a UE Route Selection Policy (URSP), a V2X Policy (V2XP), an Access Network Discovery and Selection Policy (ANDSP), and a Proximity Service (ProSE) policy. The PCF entity may be triggered to provide the path selection policy during UE Policy Association Establishment and UE Policy Association Modification procedures (e.g., initial UE registration, mobility events, etc.). These triggers occur during the same events as for access and mobility related policy (i.e. initial UE registration, mobility events, etc.).

FIG. 1 shows a typical scheme 100 for delivering a UE policy 102 in the 5G network architecture. As shown in FIG. 1, the UE policy 102 is delivered from a PCF entity 104 using Non-Access Stratum (NAS) Transport, transparently via an AMF entity 106 to a UE 108. More specifically, the AMF entity 106 establishes policy association with the PCF entity 104, whereupon the PFC entity 104 provides the UE policy 102 that should be delivered to the UE 108 via the AMF entity 106. The AMF entity 106 delivers the UE policy 102 to the UE 108 without any modification. This may be done via N1 interface by using a NAS Mobility Management (NAS-MM) protocol between the UE 108 and the AMF entity 106. At the same time, lower layers (e.g., a Media Access Control (MAC) or Radio Link Control (RLC) layers) may be used to ensure that NAS-MM messages comprising the UE policy 102 are integrity protected and/or ciphered correctly.

A decision to update the UE policy 102 may be triggered in the PCF entity 104 by comparing a list of Policy Section Identifiers (PSIs) included in UE access selection and Protocol Data Unit (PDU) session selection related policy information. Each PSI identifiers a certain Policy Section which consists of one or more policy rules (e.g., rules for selecting a certain communication path for a required communication service). By analyzing the PSIs, the PCF entity 104 may determine which policy rules the UE 108 has need to be updated. Furthermore, the decision to update the UE policy 102 may be triggered when the PCF entity 104 receives a notification of updated subscription information from a Unified Data Repository (UDR) (not shown in FIG. 1).

However, the above-described procedures for updating the UE policy 102 provide new policy rules for the UE 108 only in case of UE location changes, or UE registration from an Evolved Packet System (EPS) to a 5G system, or updates of subscription information. In other words, they do not allow the UE policy 102 to be dynamically updated based on rapidly changing radio, network and/or load conditions. This may lead, among others, to sub-optimal selection of a communication path for a required communication service, thereby adversely impacting expected QoS and the whole network performance.

The exemplary embodiments disclosed herein provide a technical solution that allows mitigating or even eliminating the above-sounded drawbacks peculiar to the prior art. In particular, the technical solution disclosed herein provides a procedure for dynamically updating a path selection policy for a UE. According to this procedure, a network entity (e.g., the PCF entity, the AF entity, or the NWDAF entity) detects the need (i.e. a triggering event) to update the path selection policy based on data relating to a first communication path currently used in accordance with the path selection policy and at least one other communication path available in a wireless communication network. The data may comprise Radio Resource Management (RRM) measurements, Radio Channel measurements, QoS parameters, their statistics or predictions, and UE notifications of a success rate of the path selection policy. The data may be collected by the network entity and/or one or more other network entities in the wireless communication network, and/or the UE itself. By using the data, the network entity dynamically updates the path selection policy by selecting, among the at least one other communication path, a second communication path to be used to support the communication service instead of the first communication path. The adaptation of the proposed updating procedure for a roaming scenario is also disclosed herein.

Figure 2:
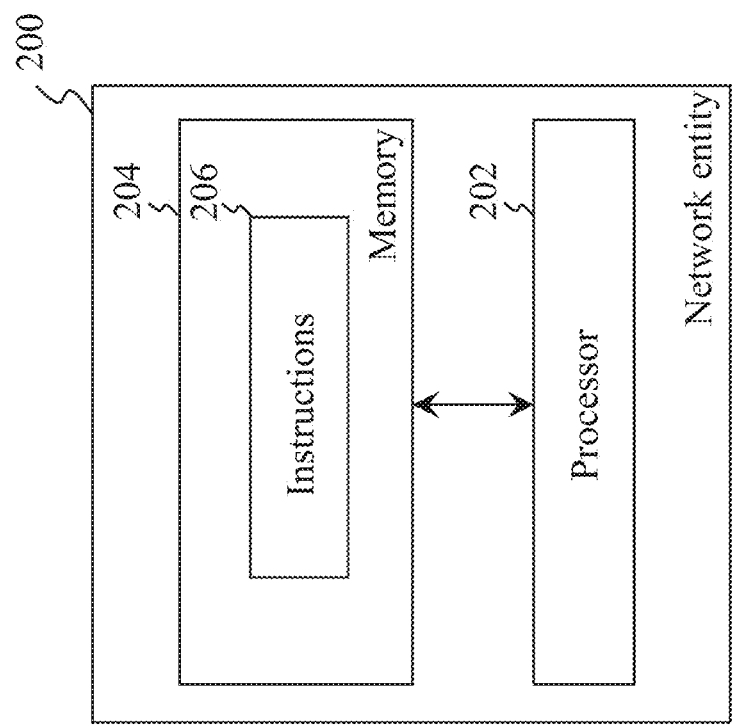
FIG. 2 shows a block diagram of a network entity in a wireless communication network in accordance with one exemplary embodiment.

FIG. 2 shows a block diagram of a network entity 200 in a wireless communication network in accordance with one exemplary embodiment. As shown in FIG. 2, the network entity 200 comprises a processor 202 and a memory 204. The memory 204 stores processor-executable instructions 206 which, when executed by the processor 202, cause the processor 202 to dynamically update a path selection policy for a certain UE, as will be described below in more detail. It should be noted that the number, arrangement and interconnection of the constructive elements constituting the network entity 200, which are shown in FIG. 2, are not intended to be any limitation of the present disclosure, but merely used to provide a general idea of how the constructive elements may be implemented within the network entity 200. For example, the processor 202 may be replaced with several processors, as well as the memory 204 may be replaced with several removable and/or fixed storage devices, depending on particular applications. Furthermore, the network entity 200 may be implemented as one of the PCF, AF and NWDAF entities; however, the present disclosure is not limited to these examples of the network entity 200—any other currently known or future network entity that could operate in accordance with the aspects of the present disclosure should be considered as a possible implementation example of the network entity 200.

The processor 202 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 202 may be implemented as any combination of one or more of the aforesaid. As an example, the processor 202 may be a combination of two or more microprocessors.

The memory 204 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 206 stored in the memory 204 may be configured as a computer-executable code which causes the processor 202 to perform the aspects of the present disclosure. The computer-executable code for carrying out operations or steps for the aspects of the present disclosure may be written in any combination of one or more programming languages, such as Java, C++, or the like. In some examples, the computer-executable code may be in the form of a high-level language or in a pre-compiled form, and be generated by an interpreter (also pre-stored in the memory 204) on the fly.

Figure 3:
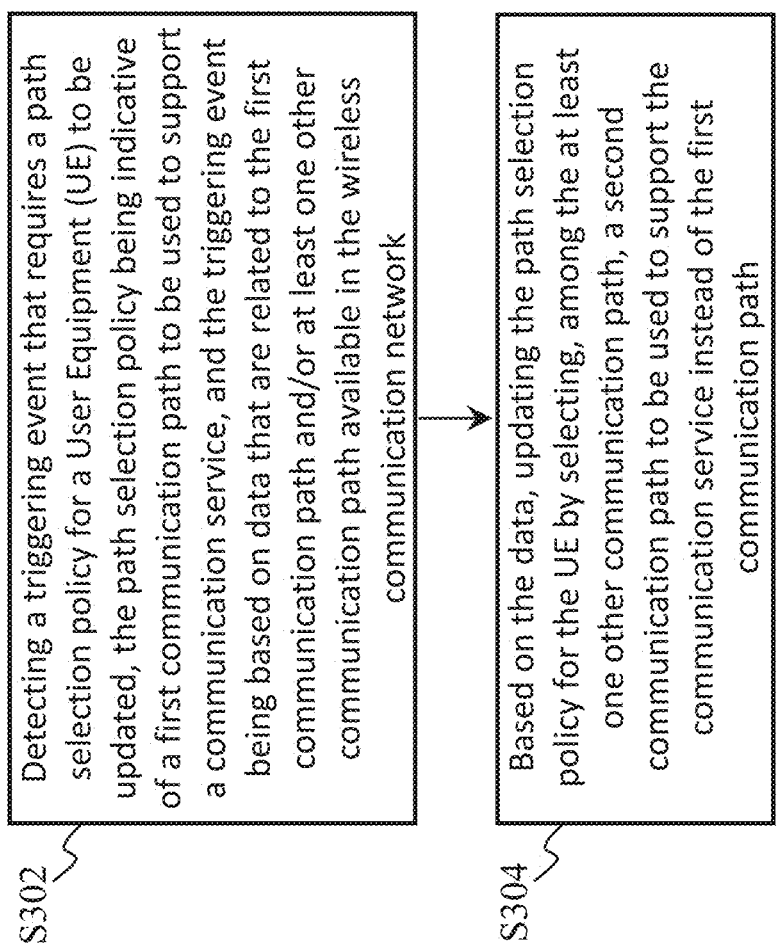
FIG. 3 shows a flowchart of a method for operating the network entity shown in FIG. 2 in accordance with one exemplary embodiment.

FIG. 3 shows a flowchart of a method 300 for operating the network entity 200 in accordance with one exemplary embodiment. The method 300 starts with a step S302, in which the processor 202 detects a triggering event that requires the path selection policy for the UE to be updated. The path selection policy is initially indicative of a first communication path to be used to support a required communication service. The triggering event is based on data that are related to the first communication path and/or at least one other communication path available in the wireless communication network. Further, the method 300 proceeds to a step S304, in which the processor 202 updates the path selection policy for the UE based on the data. The step S304 involves selecting, among the at least one other communication path, a second communication path to be used to support the communication service instead of the first communication path. By using the method 300, it is possible to dynamically update the path selection policy for the UE, considering radio and/or network conditions in the communication paths available in the wireless communication network.

The first and second communication paths may be of different types depending on a type of the required communication service and/or the path selection policy. For example, the first communication path may comprise one of the Uu path and the sidelink path, while the second communication path comprises another of the Uu path and the sidelink path, given that the path selection policy is part of one of the following other UE policies: the URSP, the Proximity Service Policy (ProSE), the V2XP, and the ANDSP. In the embodiments disclosed herein, the Uu path may refer to a communication path used to provide communications between a UE and an Application server or between the UE and another UE via a network entity (e.g., a base station), while the sidelink path may refer to a communication path used to provide communications between the UE and other UEs directly over the PC5 interface. Other possible examples of the first and second communication paths may include different satellite links, paths of different Radio Access Technologies (RATs) (e.g., Wifi, mmWave, Radar Communication, Bluetooth, Zigbee, etc.), Uu path with local breakouts, Uu paths via Mobile Edge Cloud/Computer (MEC).

The above-mentioned data comprise at least one of the following: RRM measurements; Radio Channel measurements; QoS parameters; statistics or predictions of the RRM measurements, the Radio Channel measurements, and the QoS parameters; and UE notifications of a success rate of the path selection policy. The Radio channel measurements may comprise one or more of the following: Reference Signal Received Power (RSRP), Channel State Indicator (CSI), Channel Quality Indicator (CQI), Reference Signal Received Quality (RSRQ), Carrier Received Signal Strength Indicator (RSSI), Signal-to-Noise-and-Interference Ratio (SINR). The processor 202 may either collect such data by itself or request them from one or more other network entities (e.g., the PCF entity, the NWDAF entity, the AF entity, the AN entity, the OAM entity, or any combination thereof) available in the wireless communication network. It should be noted that the UE notifications of the success rate of the path selection policy may be provided to the network entity 202 directly from the UE.

In one embodiment, the method 300 comprises a further step, in which the processor 202 indicates, in the updated path selection policy, at least one of:
- a traffic type for which the second communication path should be used;
- a UE location area where the second communication path should be used;
- communication thresholds at which the second communication path should be used;
- an application or proximity service type for which the second communication path should be used; and
- a timer indicative of a time period in which the second communication path should be used.

Some examples of the traffic type include a QoS class (e.g., a 5G QoS Identifier (5QI), PC5 QoS Identifier (PQI), etc.), a transmission type (e.g., unicast, multicast, broadcast, etc.). Some examples of the UE location area include a coverage region of a cell, a certain geographic area, a predefined tracking area. Some examples of the communication thresholds include one or more of the following:
- if a Channel Busy Ratio (CBR) of the sidelink path is above a predefined threshold (e.g., larger than 0.7), then the Uu path should be selected;
- if the RSRP or SINR, or RSRQ of the Uu path is below a predefined threshold, then the sidelink path should be selected;
- a QoS threshold (e.g., a PC5 Data Rate or bit rate) which defines a minimum or maximum level that is required to select or switch to one communication path;
- a signal threshold which defines a minimum that is required to select or switch to one communication path;
- a communication range in which the UE may connect to proximity devices and initiate discovery.

In one embodiment, the processor 202 is configured to detect the triggering event in the step S302 of the method 300 by receiving a notification of the triggering event from one or more other network entities (e.g., the PCF entity, the NWDAF entity, the AF entity, the AN entity, the OAM entity, any other core network entity, or any combination thereof) in the wireless communication network. Such a notification may comprise at least one of the following: a type of the triggering event; an identifier or descriptor of the path selection policy to be updated; an identifier of a QoS flow; a QoS status; an application type or identifier to be used via the required communication service; a proximity service type to be used via the required communication service; and conditions under which the second communication path should be used. The type of the triggering event may comprise: QoS degradation (e.g., data rate, latency, packet loss, etc.), e.g., for a certain PQI, cell, location area, type of traffic; radio signal quality degradation; a number of QoS flows failed to create per PQI; handover failures; a high communication load; and/or other network failures.

In one embodiment, the method 300 comprises a further step, before the step S304, in which the processor 202 requests recommendations for selecting the second communication path from one or more other network entities (e.g., the PCF entity, the NWDAF entity, the AF entity, the AN entity, the OAM entity, any other core network entity, or any combination thereof) in the wireless communication network. The recommendations may be based on at least one of path preferences for the required communication service, a traffic description relating to the required communication service, and a UE location. The traffic description may comprise a type of the required communication service, a QoS class, etc. The path preferences may indicate a preferred communication path (e.g., the sidelink or Uu path) for a certain traffic. Possible path preferences may look as follows:
- only the sidelink path should be used;
- only the Uu path should be used;
- the sidelink path is preferred where the UE may choose between the sidelink and Uu paths;
- the Uu path is preferred where the UE may choose between the sidelink and Uu paths; or
- no preference: both the sidelink and Uu paths are equally preferred.

In one embodiment, the method 300 comprises a further step, after the step S304, in which the processor 202 provides the updated path selection policy to the UE or to one or more other network entities (e.g., the PCF entity, the NWDAF entity, the AF entity, the AN entity, the OAM entity, any other core network entity, or any combination thereof) in the wireless communication network.

Figure 4:
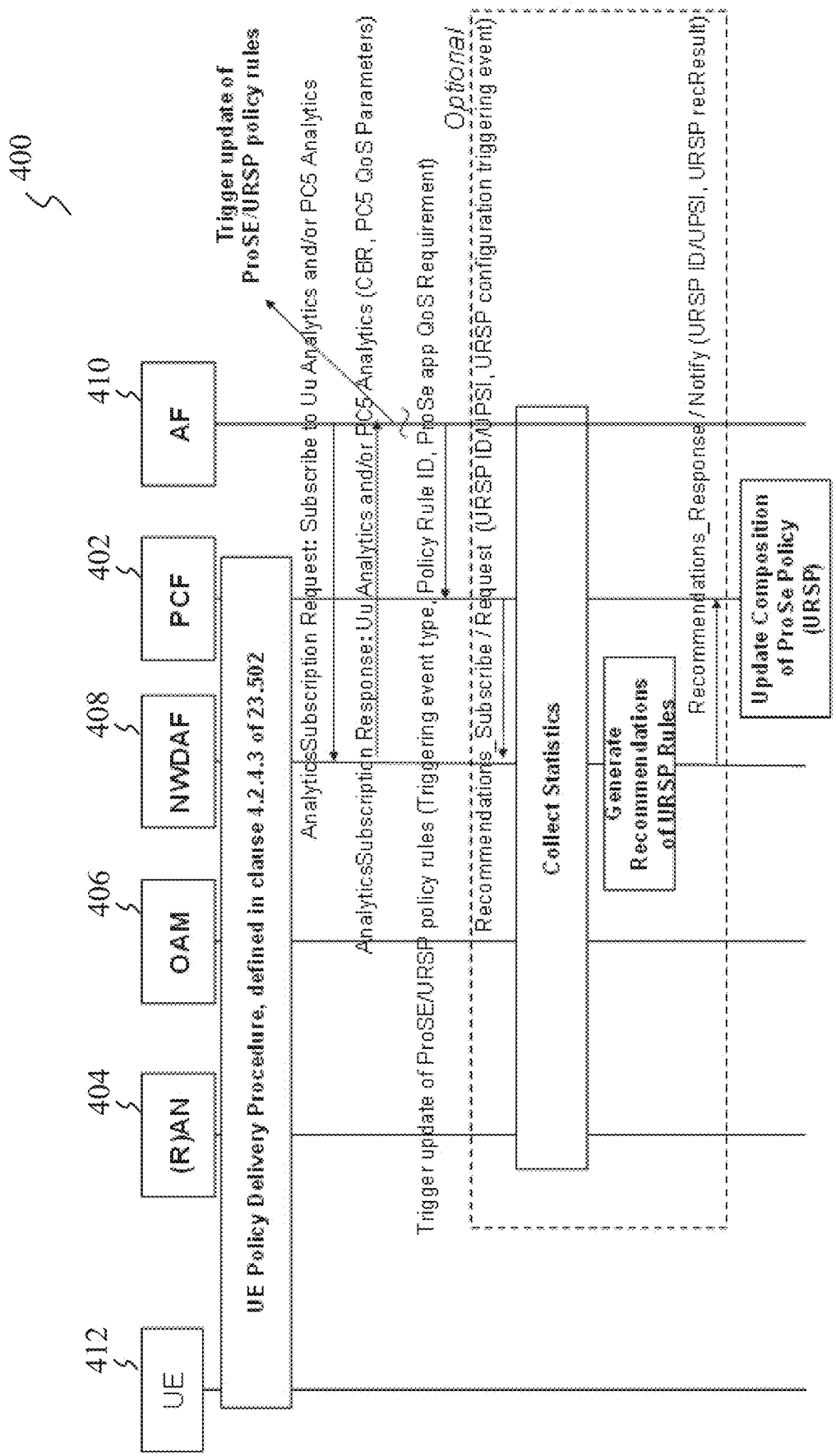
FIGS. 4-8 show interaction diagrams for network entities of the wireless communication network in accordance with different exemplary embodiments.

FIG. 4 shows an interaction diagram 400 for the network entities of the wireless communication network in accordance with one exemplary embodiment. In the interaction diagram 400, the network entity 200 is intended to be implemented as a PCF entity 402, while other network entities are represented by a R(AN) 404, an OAM entity 406, an NWDAF entity 408, and an AF entity 410. It is also assumed that the path selection policy is part of the ProSE/URSP policy initially provided to a UE 412 in accordance with a conventional UE policy delivery procedure (e.g., as defined in clause 4.2.4.3 of 3GPP TS 23.502, "Technical Specification Group Services and System Aspects; Procedures for the 5G System (5GS)"), and the first and second communication paths comprise the Uu and sidelink paths. The AF entity 410, located either inside a Public Land Mobile Network (PLMN) domain or outside the PLMN domain, is responsible for checking if the ProSE/URSP policy should be updated in terms of path selection. To do this, the AF entity 410 may subscribe to the NWDAF entity 408 (via a Network Exposure Function (NEF) entity if the AF entity 410 is out of the PLMN domain) to collect, for example, statistics or analytics (e.g., the RSRP, SINR, QoS parameters) for the Uu path and/or statics or analytics (e.g., the CBR, RSRP, QoS parameters) for the sidelink path to provide different UE configurations, e.g., per flow or per cell, or per geographical area. The AF entity 402 detects, based on the collected analytics or statistics, the need to update the ProSE/URSP policy in terms of the path selection (i.e. the triggering event), by assessing if the existing rules of the ProSE/URSP policy may be optimized or even mapped in a better way to the radio and/or network conditions.

The AF entity 410 then sends the notification of the triggering event to the PCF entity 402, thereby triggering the update of the ProSE/URSP policy in terms of the path selection in the PCF entity 402. As noted above, the notification may comprise different information, such, for example, as the type of the triggering event, the identifier or descriptor of the path selection policy to be updated, the identifier of a QoS flow, the QoS status, etc. In response, the PCF entity 402 updates the composition of the ProSE/URSP policy in terms of the path selection using information from the AF 410 entity, the (R)AN 404, the OAM entity 406, and/or the NWDAF entity 408. To update the ProSE/URSP policy, the PCF entity 402 may optionally ask the NWDAF entity 408 to provide the recommendations for the update of the policy (i.e. for selecting the second communication path, either the Uu path or the sidelink path in this embodiment). It should be noted that the NWDAF entity 408 may "collect statistics" from various sources to build the recommendations, depending also on the type of the triggering event. The NWDAF entity 408 may use monitoring data for the Uu path and/or of the sidelink path and correlate them with service data relating to the required communication service. After that, the NWDAF entity 408 may generate and provide the recommendations to the PCF entity 402 (see "URSP recResult" in FIG. 4). For example, the URSP recResult may include the recommendations for updates of any one of the above-described path preferences, traffic description and/or UE location information. The updated rules of the ProSE/URSP policy (which are related to the path selection) may be then provided to the UE 412.

Figure 5:
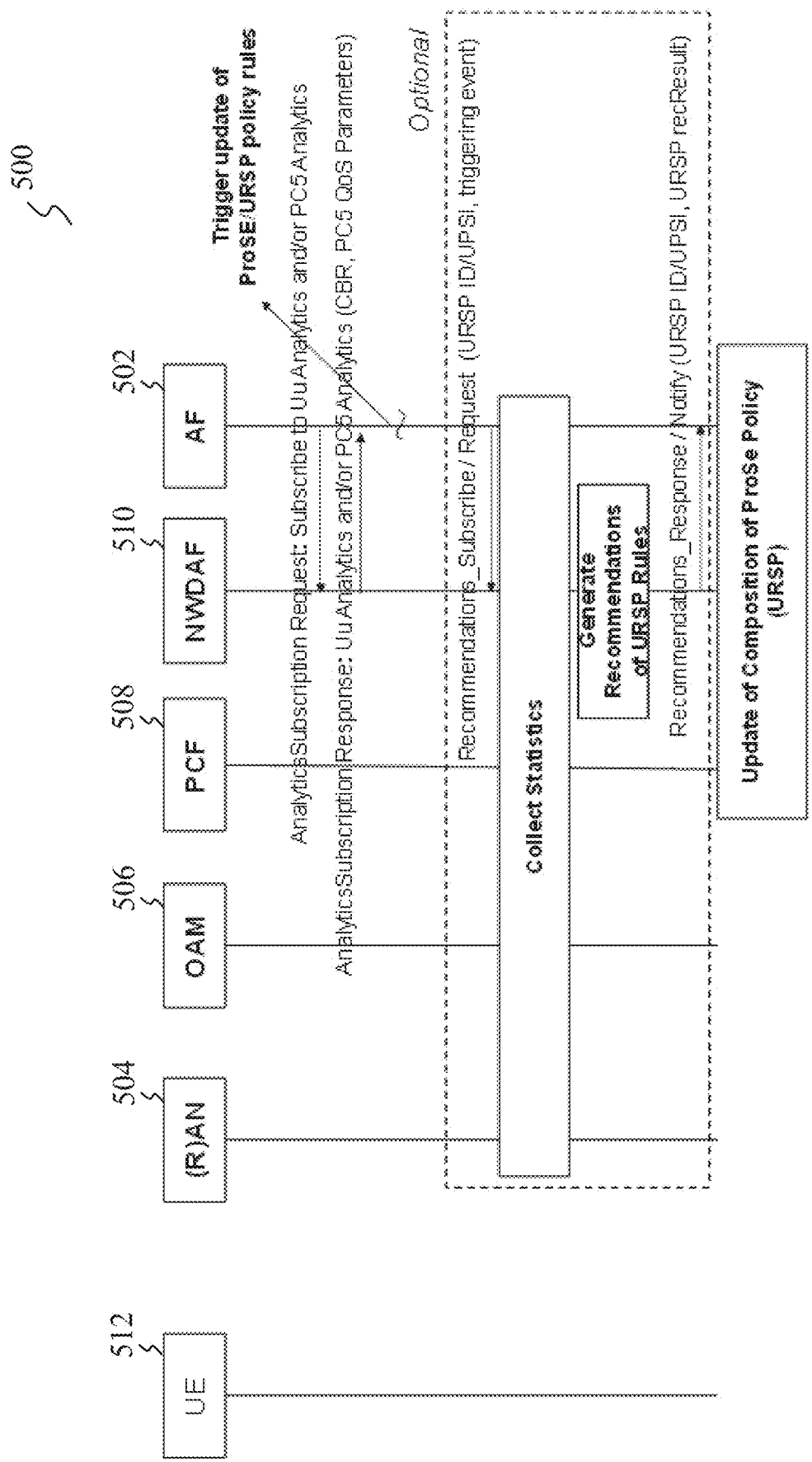

FIG. 5 shows an interaction diagram 500 for the network entities of the wireless communication network in accordance with one other exemplary embodiment. In the interaction diagram 500, the network entity 200 is intended to be implemented as an AF entity 502, while other network entities are represented by a R(AN) 504, an OAM entity 506, a PCF entity 508, and a NWDAF entity 510. It is again assumed that the path selection policy is part of the ProSE/URSP policy for a UE 512, and the first and second communication paths comprise the Uu and sidelink paths. Similar to the AF entity 410 in the interaction diagram 400, the AF entity 502, located either inside the PLMN domain or outside the PLMN domain, is responsible for checking if the ProSE/URSP policy should be updated in terms of the path selection. To do this, the AF entity 502 may subscribe to the NWDAF 510 to collect the same or similar statistics or analytics for the Uu path and/or the sidelink path. Contrary to the AF entity 410 in the interaction diagram 400, when the AF entity 502 detects, based on the collected analytics or statistics, the need to update the ProSE/URSP policy in terms of the path selection (i.e. the triggering event), it directly updates the ProSE/URSP policy. Said updating the ProSE/URSP policy may be based on the recommendations optionally generated and provided by the NWDAF entity 510 based on different statistics from the (R)AN 504, the OAM entity 506 and the PCF entity 508. Once the ProSE/URSP policy is updated in terms of the path selection, the AF entity 502 may provide it to the PCF 508 for its further delivery to the UE 512.

Figure 6:
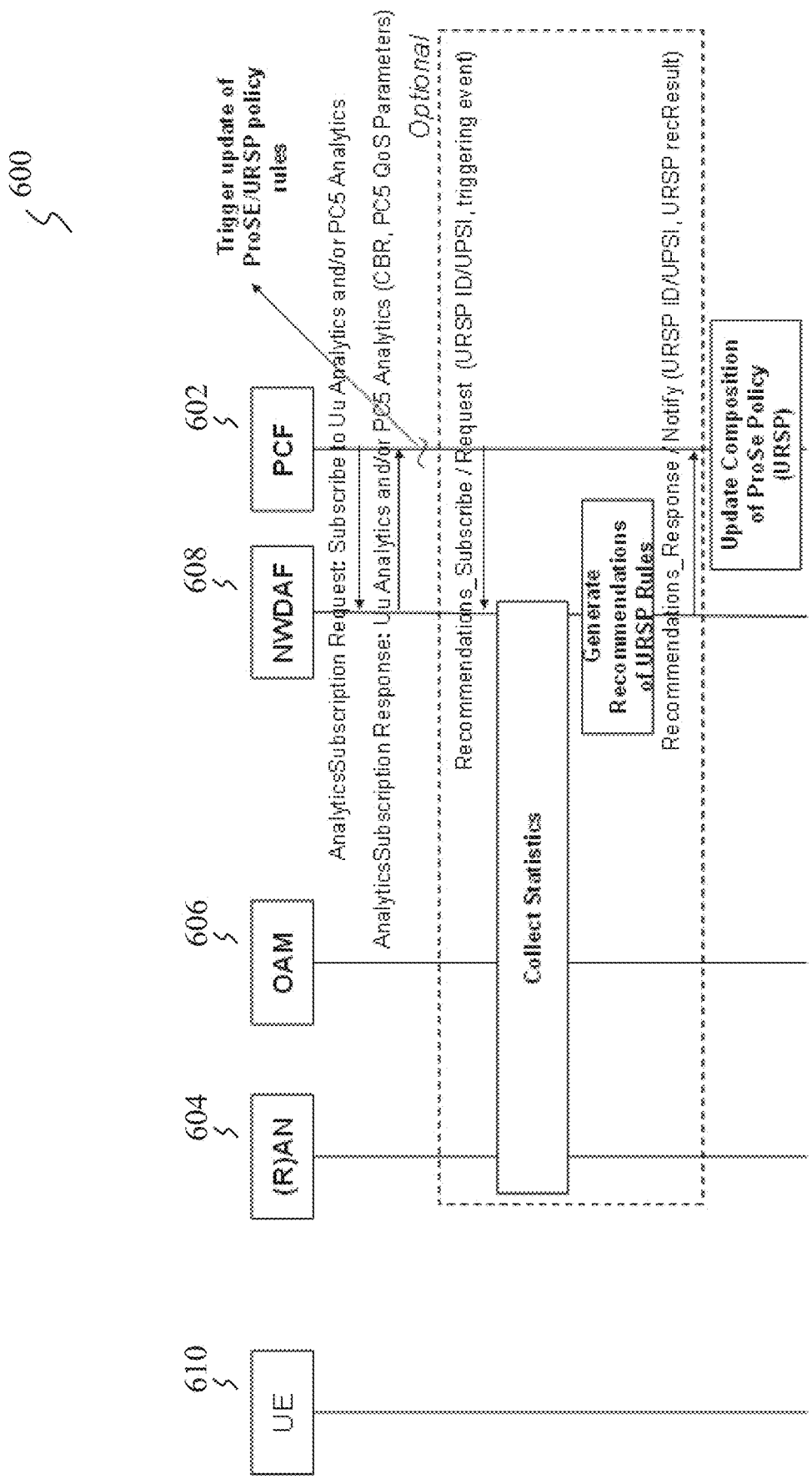

FIG. 6 shows an interaction diagram 600 for the network entities of the wireless communication network in accordance with one more other exemplary embodiment. In the interaction diagram 600, the network entity 200 is intended to be implemented as a PCF entity 602, while other network entities are represented by a R(AN) 604, an OAM entity 606, and a NWDAF entity 608. It is again assumed that the path selection policy is part of the ProSE/URSP policy for a UE 610, and the first and second communication paths comprise the Uu and sidelink paths. In this embodiment, the PCF entity 602 detects the need to update the ProSE/URSP policy in terms of the path selection (i.e. the triggering event) by itself and trigger the update. To do this, the PCF entity 602 collects the same or similar analytics or statistics for the Uu and/or sidelink paths, which are provided by the NWDAF entity 608, and use it to properly update the ProSE/URSP policy. The PCF entity 602 may optionally ask the NWDAF entity 608 to provide the recommendations for the update of the ProSE/URSP policy in terms of the path selection. The NWDAF entity 608 may generate the recommendations based on different information from the R(AN) 604 and the OAM entity 606. Once the ProSE/URSP policy is updated in terms of the path selection, the PCF entity 602 may provide it to the UE 610.

Figure 7:
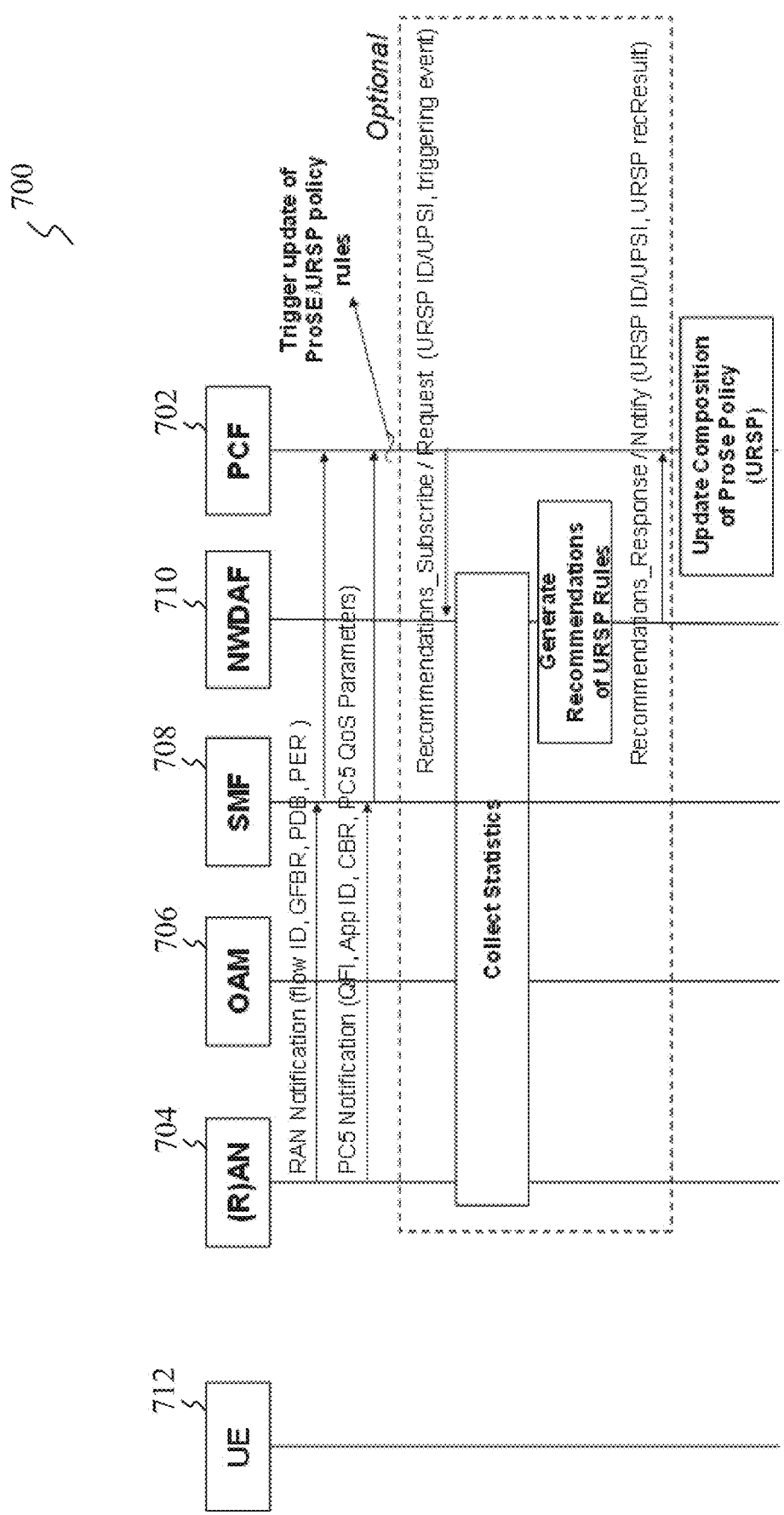

FIG. 7 shows an interaction diagram 700 for the network entities of the wireless communication network in accordance with one more other exemplary embodiment. In the interaction diagram 700, the network entity 200 is intended to be implemented as a PCF entity 702, while other network entities are represented by a R(AN) 704, an OAM entity 706, an SMF entity 708, a NWDAF entity 710. It is again assumed that the path selection policy is part of the ProSE/URSP policy for a UE 712, and the first and second communication paths comprise the Uu and sidelink paths. In this embodiment, the PCF entity 702 uses notifications from the (R)AN 704 that the QoS of the sidelink path and/or the QoS flows in the Uu path cannot be fulfilled. These notifications can help the PCF entity 702 to detect the triggering event as well as to update accordingly the ProSE/URSP policy in terms of the path selection. This approach could allow the ProSE/URSP policy to be updated faster by using 'live' data from the (R)AN 704.

More specifically, as shown in FIG. 7, the (R)AN 704 provides the notifications to the SMF entity 708 first and then to the PCF entity 702. The notifications are indicative of the QoS flow and the QoS parameters/requirements (e.g., the QoS parameters, CBR, etc., for the sidelink path) that can no longer (or can again) be guaranteed. As mentioned above, the notifications are used by the PCF entity 702 to detect the triggering event and update the ProSE/URSP policy in terms of the path selection.

Currently for the Uu path, the SMF entity should only enable notification control when a QoS notification control parameter is set in a PCC rule (received from the PCF entity 702) that is bound to the QoS Flow. The notification control parameter is signalled to the (R)AN 704 as part of a QoS profile. The previous should also apply for the sidelink path, i.e. include a QoS notification control parameter for the sidelink path in a PCC rule.

Again, the PCF entity 702 may optionally ask the NWDAF entity 710 to provide the recommendations for the update of the ProSE/URSP policy in terms of the path selection. The NWDAF entity 710 may generate the recommendations based on different information from the R(AN) 704, the OAM entity 706, and the SMF 708. Once the ProSE/URSP policy is updated in terms of the path selection, the PCF entity 702 may provide it to the UE 712.

It should be noted that the AF entity (e.g., the AF entity 410 or 502) may additionally receive different PC5 and/or Uu notifications. The AF entity may then forward the PC5 and/or Uu notifications to the PCF (e.g., any of the PCF 402, 508 or 702), or use them according to the interactions shown in the diagrams 400 to 600. In other words, the PC5 and/or Uu notifications may be used together with the collected analytics or statistics for the Uu path and/or the sidelink path to properly detect when the ProSE/URSP policy needs the update in terms of the path selection.

Figure 8:
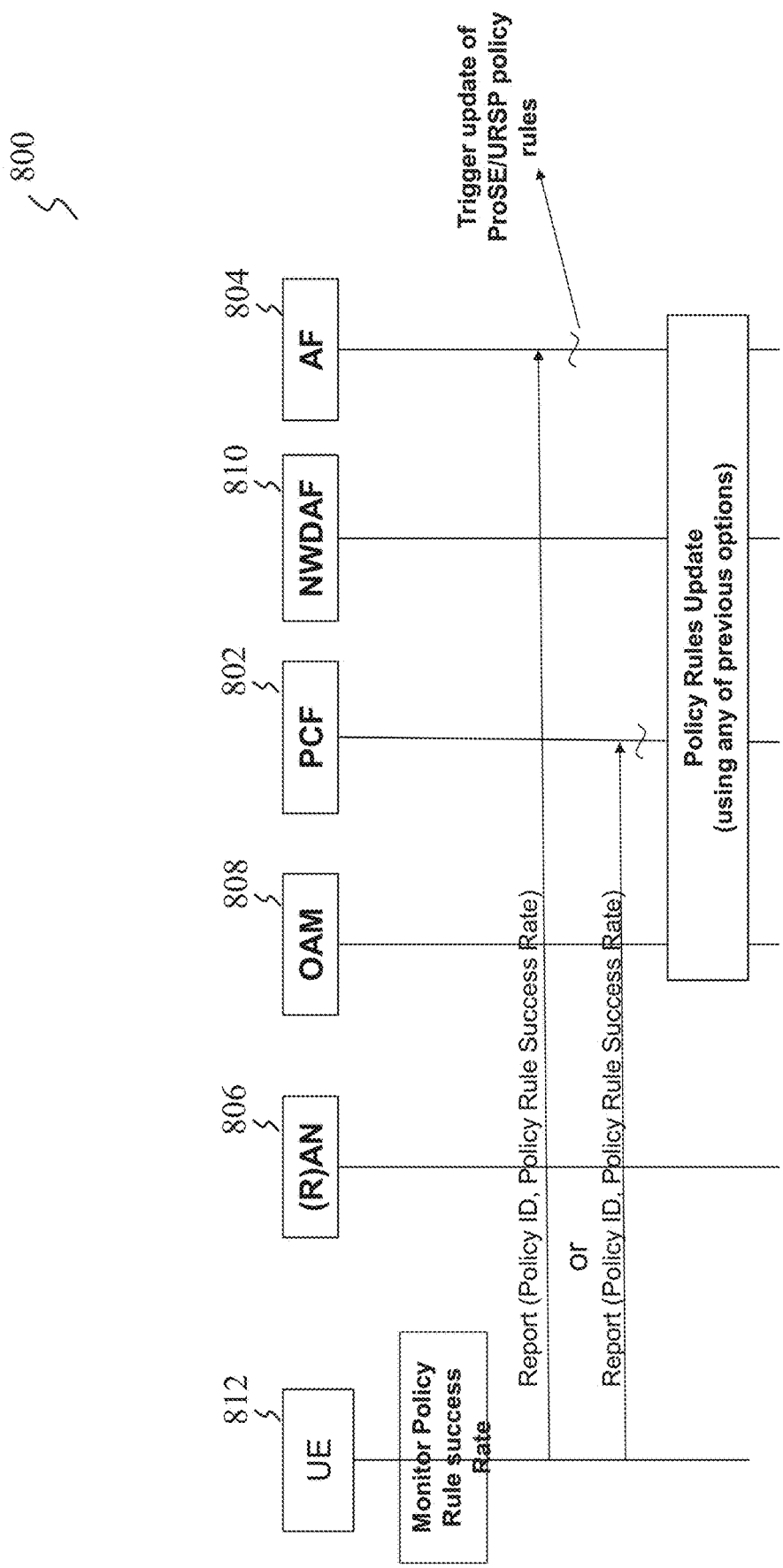

FIG. 8 shows an interaction diagram 800 for the network entities of the wireless communication network in accordance with one more other exemplary embodiment. In the interaction diagram 700, the network entity 200 is intended to be implemented as a PCF entity 802 or an AF entity 804, while other network entities are represented by a R(AN) 806, an OAM entity 808, and a NWDAF entity 810. It is again assumed that the path selection policy is part of the ProSE/URSP policy for a UE 812, and the first and second communication paths comprise the Uu and sidelink paths. In this embodiment, the UE 812 monitors the performance (success) of applied policy rules for the path selection (i.e. the so-called 'policy rule success rate'). The policy rules are successful if the expected QoS is achieved for a specific location, application cast-type that is described in a rule. As shown in FIG. 8, the UE 812 reports the UE notifications of the success rate either to the PCF entity 802 or to the AF entity 804 to facilitate the detection of the triggering event. After that, any of the PCF entity 802, the AF entity 804, the OAM entity 808, and the NWDAF entity 810 may trigger the update of the ProSE/URSP policy in terms of the path selection. Thus, the interaction diagram 800 may be considered as an enhancement to any of the interaction diagrams 400-700.

Referring back to FIGS. 2 and 3, let us now consider how the network entity 200 and its operation method 300 may be adapted for a roaming scenario. According to the existing state of affairs, a Visiting PCF (V-PCF) entity of a Visiting Public Land Mobile Network (VPLMN) receives a UE policy from a Home PCF (H-PCF) entity of a Home Public Land Mobile Network (HPLMN) and forwards it to a UE via an Access and Mobility Management Function (AMF). Thus, the UE Policy may only be provided by the H-PCF entity, but should not be provided by the V-PCF entity. However, this is not efficient for the URSP policy that may be updated, for example, in terms of the path selection, since the HPLMN is not aware of VPLMN network conditions (e.g., the above-mentioned (R)AN notifications, analytics or statistics, etc.) that may trigger updates of the URSP policy. If the UE is connected in the VPLMN (i.e. the roaming, cross-border scenario), the H-PCF entity does not know the network conditions for the PC5 and/or Uu path.

Figure 9:
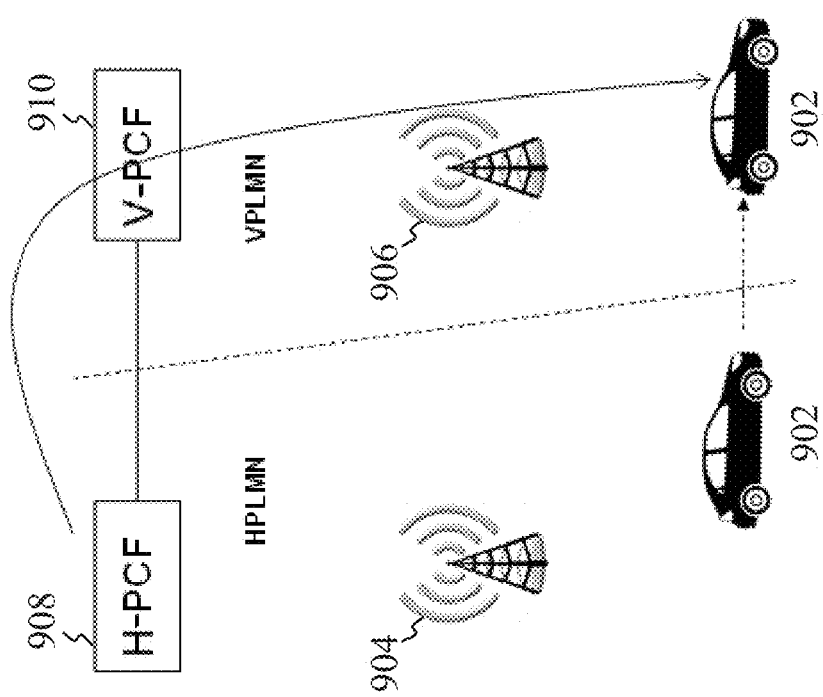
FIG. 9 shows a typical URSP delivery for a UE (vehicle) in a roaming scenario.

FIG. 9 shows a typical URSP delivery for a UE (vehicle) 902 in a roaming scenario. As shown in FIG. 9, the vehicle 902 may change a HPLMN 904, for example, due to a country change (cross-border scenario), and connect to a VPLMN 906. The vehicle 902 receives URSP rules from a H-PCF entity 908 of the HPLMN 904 via a V-PCF entity 910. Then, the vehicle 902 selects an appropriate communication path or interface in the VPLMN 906 for a specific communication service, using the URSP rules of the HPMLN 904. The selection of the communication path in this way may lead to a wrong or inefficient selection decision at the UE side about the best communication path or interface for the communication service and location. The H-PLMN 904 does not have information of radio conditions, for example, for the sidelink path, hence the defined URSP rules for the path selection are based only on static information (e.g., the type of the communication service). Thus, the interaction of the V-PCF entity 910 and the H-PCF entity 908 is needed to allow the path selection rules to be updated dynamically.

Figure 10:
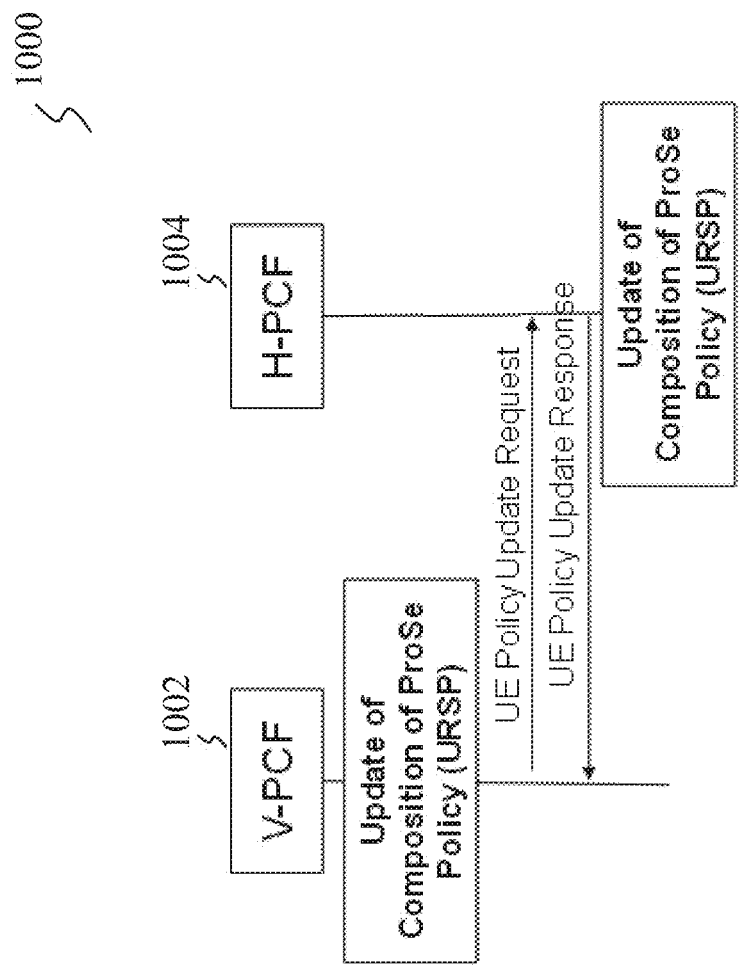
FIGS. 10 and 11 show interaction diagrams for a V-PCF entity and a H-PCF entity in a UE roaming scenario in accordance with two different exemplary embodiments.

FIG. 10 shows an interaction diagram 1000 for a V-PCF entity 1002 and a H-PCF entity 1004 in the roaming scenario in accordance with one exemplary embodiment. The interaction diagram 1000 may be used to eliminate or mitigate the above-described drawback of the conventional "static" updating procedure. In this embodiment, the network entity 200 is intended to be implemented as the V-PCF entity 1002. Given this, the processor 202 is further configured to perform the step S304 of the method 300, i.e. update the URSP for a UE, like the vehicle 902, by sending a request for updating the URSP to the H-PCF entity 1004. The request may comprise data that are related to the Uu path and/or the sidelink path (for example, the RRM measurements, Radio Channel measurements, QoS parameters, their statistics or predictions, and UE notifications of the success rate of the URSP), and/or the recommendations for selecting the appropriate communication path. In response to this request, the H-PCF entity 1004 updates the URSP in terms of the path selection and sends an update confirmation to the V-PCF entity 1004, i.e. the processor 202.

Figure 11:
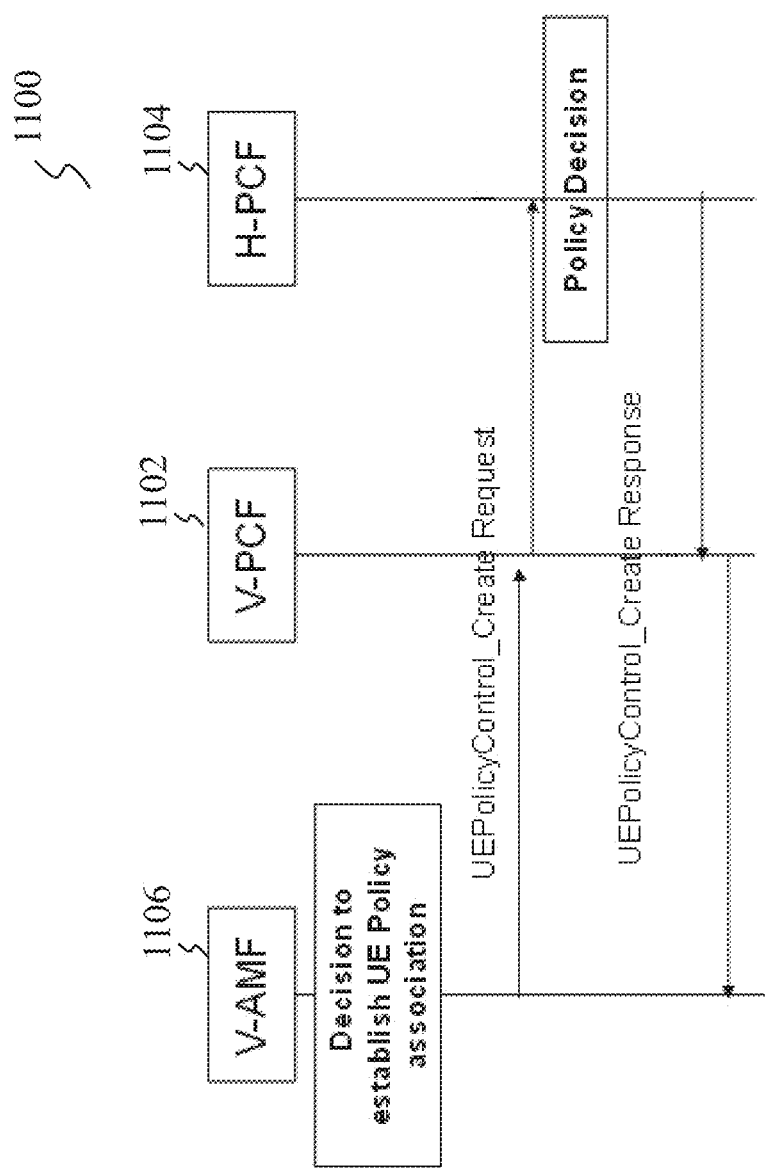

FIG. 11 shows an interaction diagram 1100 for a V-PCF entity 1102 and a H-PCF entity 1104 in the roaming scenario in accordance with one other exemplary embodiment. In general, the interaction diagram 1100 may be considered as an enhancement of the interaction diagram 1000. Similarly, the network entity 200 is intended to be implemented as the V-PCF entity 1102. The interaction diagram 1100 involves that, at some point of the interaction (event at the beginning of UE policy establishment association initiated by a visiting AMF (V-AMF) entity 1106), the V-PCF entity 1102, i.e. the processor 202, requests the H-PCF entity 1104 to grant an authority to update the URSP for the UE in the visiting PCF entity 1102, and receives a corresponding confirmation from the H-PCF entity 1104.

It should be noted that each step or operation of the method 300, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the executable instructions which embody the steps or operations described above can be stored on a corresponding data carrier and executed by the processor 202. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A network entity in a wireless communication network, comprising:
    at least one processor; and
    a memory coupled to the at least one processor and storing programing instructions for execution by the at least one processor to:
        detect, based on data related to one or more communication paths available in a wireless communication network, a triggering event that indicates a path selection policy for a User Equipment (UE) to be updated, wherein the path selection policy for the UE indicates a first communication path of the one or more communication paths to support a communication service;
        receive recommendations for selecting a second communication path from at least one other network entity, wherein the recommendations are based on at least one of path preferences for the communication service, a traffic description relating to the communication service, or a UE location;
        sending a request for updating the path selection policy to another network entity, wherein the request comprises at least one of the data that are related to the one or more communication paths available in the wireless communication network or the recommendations for selecting the second communication path; and
        receive a confirmation from the another network entity that the path selection policy has been updated based on the at least one of the data or the recommendations by selecting the second communication path to support the communication service instead of the first communication path.

2. The network entity of claim 1, wherein the programing instructions are for execution by the at least one processor to:
    indicate, in the updated path selection policy for the UE, at least one of a traffic type, a UE location area, communication thresholds, an application or proximity service type, or a timer indicative of a time period for using the second communication path.

3. The network entity of claim 1, wherein the first communication path is a Uu path and the second communication path is a sidelink path, or the first communication path is a side link path and the second communication path is a Uu path.

4. The network entity of claim 1, wherein the data relating to the one or more communication paths comprises at least one of:
    Radio Resource Management (RRM) measurements;
    Radio Channel measurements;
    Quality of Service (QOS) parameters;
    statistics or predictions of the RRM measurements, the Radio Channel measurements, and the QOS parameters; or UE notifications of a success rate of the path selection policy.

5. The network entity of claim 4, wherein the programing instructions are for execution by the at least one processor to:
send a request for at least one of the RRM measurements, the QOS parameters, the Radio Channel measurements, and the statistics or predictions to at least one other network entity in the wireless communication network; and
receive the at least one of the RRM measurements, the QOS parameters, the Radio Channel measurements, and the statistics or predictions from the at least one other network entity.

6. The network entity of claim 5, wherein the network entity is implemented as one of a Policy Charging Function (PCF) entity, an Application Function (AF) entity, and a Network Data Analytics Function (NWDAF) entity, and wherein the at least one other network entity comprises at least one of a PCF entity, a NWDAF entity, an AF entity, a Radio Access Node, or an Operation and Maintenance entity.

7. The network entity of claim 4, wherein the programing instructions are for execution by the at least one processor to:
receive the UE notifications of the success rate of the path selection policy from the UE or at least one other network entity in the wireless communication network.

8. The network entity of claim 1, wherein the programing instructions are for execution by the at least one processor to:
detect the triggering event by receiving a notification of the triggering event from at least one other network entity in the wireless communication network.

9. The network entity of claim 8, wherein the notification comprises at least one of:
a type of the triggering event;
an identifier or descriptor of the path selection policy to be updated;
an identifier of a QoS flow;
a QoS status;
an application type or identifier to be used via the communication service;
a proximity service type to be used via the communication service; or
conditions under which the second communication path is to be used.

10. The network entity of claim 1, wherein the programing instructions are for execution by the at least one processor to:
provide the updated path selection policy to the UE or to at least one other network entity in the wireless communication network.

11. The network entity of claim 1, wherein the programing instructions are for execution by the at least one processor to:
before receiving the recommendations from the at least one other network entity, send a request for recommendations for selecting the second communication path to the at least one other network entity in the wireless communication network.

12. The network entity of claim 11, wherein the wireless communication network is a Visiting Public Land Mobile Network (VPLMN), the network entity is configured to be implemented as a visiting Policy Charging Function (PCF) entity, and the another network entity is configured to be implemented as a Home Public Land Mobile Network.

13. The network entity of claim 12, wherein the programing instructions are for execution by the at least one processor to:
request the home PCF entity to grant an authority to update the path selection policy for the UE in the visiting PCF entity; and
receive a confirmation from the home PCF entity that the visiting PCF entity is granted the authority to update the path selection policy for the UE.

14. The network entity of claim 1, wherein the path selection policy is part of at least one of a UE Route Selection Policy, a Proximity Service Policy, a Vehicle-to-Everything Policy, or an Access Network Discovery and Selection Policy.

15. A method for operating a network entity in a wireless communication network, comprising:
detecting, based on data related to one or more communication paths available in a wireless communication network, a triggering event that indicates a path selection policy for a User Equipment (UE) to be updated, wherein the path selection policy for the UE indicates a first communication path of the one or more communication paths to support a communication service;
receiving recommendations for selecting a second communication path from at least one other network entity, wherein the recommendations are based on at least one of path preferences for the communication service, a traffic description relating to the communication service, or a UE location;
sending a request for updating the path selection policy to another network entity, wherein the request comprises at least one of the data that are related to the one or more communication paths available in the wireless communication network or the recommendations for selecting the second communication path; and
updating, based on the at least one of the data or the recommendations, the path selection policy for the UE by selecting a second communication path from the one or more communication paths to support the communication service instead of the first communication path.

16. The method of claim 15, further comprising:
indicating, in the updated path selection policy for the UE, at least one of a traffic type, a UE location area, communication thresholds, an application or proximity service type, or a timer indicative of a time period for using the second communication path.

17. The method of claim 15, wherein the first communication path is a Uu path and the second communication path is a sidelink path, or the first communication path is a sidelink path and the second communication path is a Uu path.

18. A non-transitory computer program product storing a computer-readable storage medium, wherein the computer-readable storage medium comprises a computer code which, when executed by at least one processor, causes the at least one processor to perform operations comprising:
detecting, based on data related to one or more communication paths available in a wireless communication network, a triggering event that indicates a path selection policy for a User Equipment (UE) to be updated, wherein the path selection policy for the UE indicates a first communication path of the one or more communication paths to support a communication service;
receiving recommendations for selecting a second communication path from at least one other network entity, wherein the recommendations are based on at least one of path preferences for the communication service, a traffic description relating to the communication service, or a UE location;

sending a request for updating the path selection policy to another network entity, wherein the request comprises at least one of the data that are related to the one or more communication paths available in the wireless communication network or the recommendations for selecting the second communication path; and updating, based on the at least one of the data or the recommendations, the path selection policy for the UE by selecting a second communication path from the one or more communication paths to support the communication service instead of the first communication path.

19. The non-transitory computer program product of claim 18, wherein the operations further comprising:

indicating, in the updated path selection policy for the UE, at least one of a traffic type, a UE location area, communication thresholds, an application or proximity service type, or a timer indicative of a time period for using the second communication path.

20. The non-transitory computer program product of claim 18, wherein the first communication path is a Uu path and the second communication path is a sidelink path, or the first communication path is a side link path and the second communication path is a Uu path.

\* \* \* \* \*